Sept. 15, 1970          R. D. KEEN          3,529,234
VAPOR QUALITY MEASURING DEVICE
Filed Dec. 13, 1967
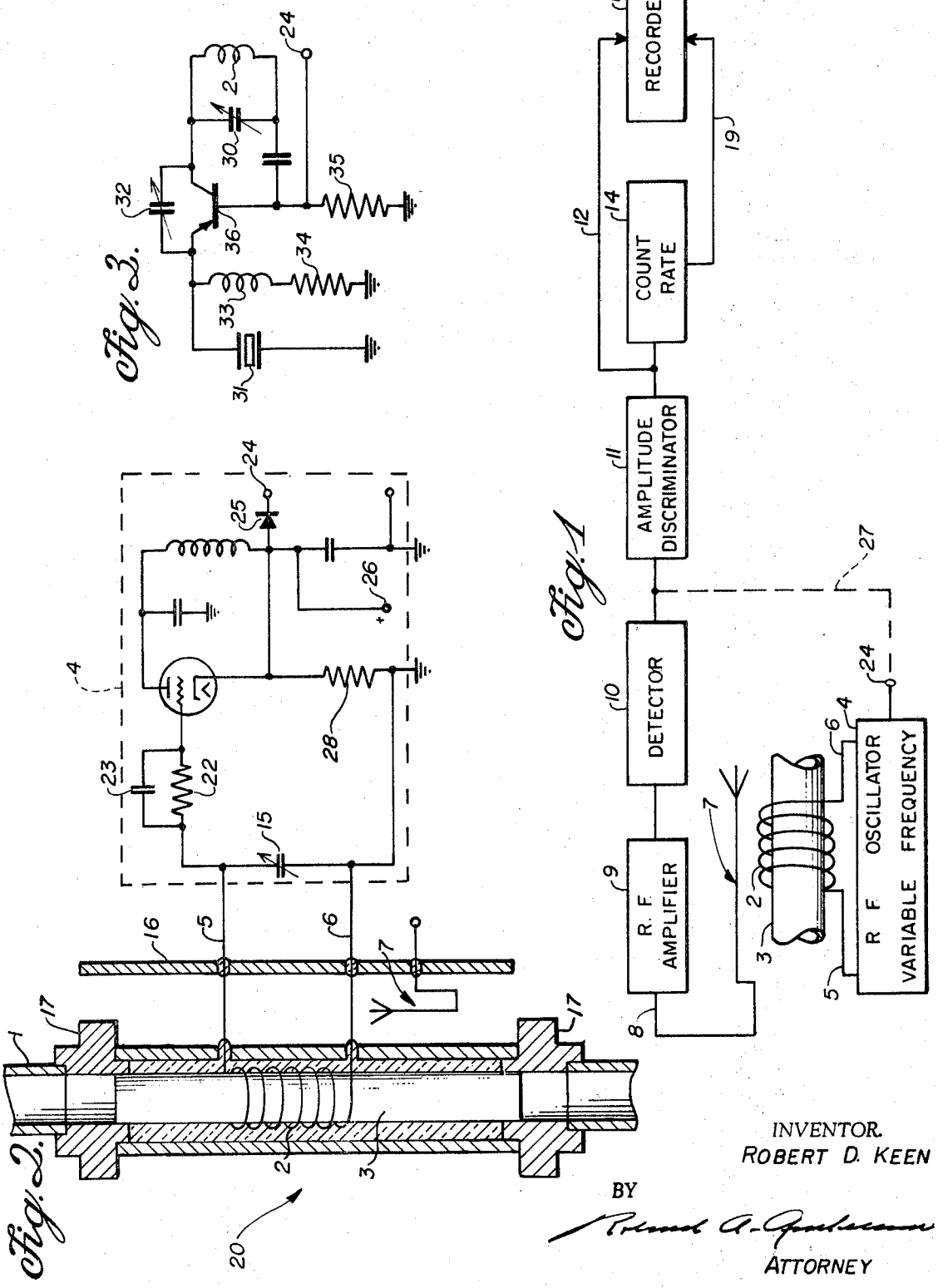
INVENTOR.
ROBERT D. KEEN
BY
ATTORNEY

United States Patent Office 3,529,234
Patented Sept. 15, 1970

3,529,234
VAPOR QUALITY MEASURING DEVICE
Robert D. Keen, Canoga Park, Calif., assignor, by mesne assignments, to the United States of America as represented by the United States Atomic Energy Commission
Filed Dec. 13, 1967, Ser. No. 690,252
Int. Cl. G01n 27/78
U.S. Cl. 324—.5                    5 Claims

ABSTRACT OF THE DISCLOSURE

A method and apparatus for measuring "void fraction" or vapor quality in a flowing two-phase liquid metal stream. Bubbles are also detected, and the size of bubbles can be determined. The tank coil of a high frequency oscillator is placed about a pipe containing the flowing fluid which may be in either a liquid or vapor phase or combination thereof. At a particular frequency, resonance coupling occurs between the coil and the nuclei of the fluid, resulting in an absorption of energy by the nuclei. The amount of energy absorption depends upon the cross sectional area of the fluid as modified by any vapor bubbles, so that the output from a detecting circuit will indicate the bubble content of a liquid fluid system or the vapor quality of amount of liquid in a vapor system.

BACKGROUND OF THE INVENTION

This invention relates to a vapor quality measuring device, and to apparatus for detecting bubbles in liquid metal. The invention described herein was made in the course of, or under, Contract AT(11-1)-GEN-8 with the U.S. Atomic Energy Commission.

Fluid metal systems are becoming increasingly important as liquid metal coolants for nuclear reactors in the liquid phase and as power conversion driving systems in the vapor phase, such as for rotating turbines and for thermoelectric applications. In some applications, both the liquid and vapor phases of such metals may be of importance.

One important use of liquid metal is as the coolant for a nuclear reactor. In addition to cooling the reactor, such liquid metal also affects the reactivity of the reactor. A problem exists in that bubbles or vapor within the liquid metal coolant, in addition to affecting heat transfer, also affect the reactivity of the reactor and may even cause a power excursion. The detection and measurement of such bubbles within the liquid metal is thus an important object of this invention.

In the case of metals existing in the vapor phase, for rotating turbines and other applications, the amount of liquid droplets within such vapor is of importance since such liquid may damage the turbine blades and result in corrosion, etc. Thus it is another object of this invention to measure the amount of liquid within the metal vapor system or otherwise determine the "vapor quality."

SUMMARY OF THE INVENTION

The invention solves the problem of detecting bubbles or vapor within the liquid metal system or liquid metal droplets within the vapor system by using a high frequency oscillator which is placed adjacent the pipe containing the flowing liquid or vapor; the oscillator is tuned for resonance coupling at the characteristic resonance absorption frequency of the liquid. Energy absorption by the liquid is indicated by either the oscillator current measurement or by a sensor coil or antenna which is connected to a detector or radio receiver. The receiver or oscillator current measurement, when calibrated, indicates discrete vapor or bubble count in a liquid metal system or the percentage of liquid-vapor flow, vapor qual-
ity in a vapor system. Measurement of void fraction, or quality, or percent liquid/vapor flow is critical for metal vapor-driven turbines, for example the mercury vapor turbines, for example the mercury vapor turbine of SNAP 2, MRP or SNAP 8.

BRIEF DESCRIPTION OF THE DRAWING

FIG. 1 illustrates a block diagram of the invention to illustrate its operation.
FIG. 2 illustrates one preferred embodiment of the invention.
FIG. 3 illustrates a schematic diagram of a preferred solid state oscillator-detector circuit for use in FIG. 1.

DESCRIPTION OF THE PREFERRED EMBODIMENT

In FIG. 1, there is shown a pipe 1 which carries the fluid metal, in either liquid or vapor state, such as sodium or mercury, from a reactor (not shown) to a boiler (not shown) in the case of liquid, or from a boiler to a turbine in the case of metal vapor. The pipe is generally metal such as stainless steel. However, it is preferred that the section of pipe at 3, adjacent coil 2, be made of either a thin-walled stainless steel or alternatively of an electrically non-conductive material, such as ceramic, or semi-conductive material, such as $Al_2O_3$ or BeO, for example.

A variable frequency oscillator 4 is connected over lines 5 and 6 to a tank or coupling coil 2. The frequency of the oscillator is variable over a range including a specific frequency at which resonance coupling exists between the electro-magnetic radiation of the oscillator coil 2 and the nuclear magnetic spin of the liquid metal nuclei. In the case of liquid metal mercury, this frequency is 58 megacycles. At such frequency, hereinafter referred to as the nuclear resonance absorption frequency, nuclear resonance occurs in the liquid metal and results in an absorption of power therein in proportion to the quantity of material in the test section of the pipe. Thus, since the vapor bubbles do not absorb as much energy, the presence of bubbles in the liquid varies the amount of power absorbed; similarly, in the case of a flowing vapor, the liquid metal droplets therein absorb power in proportion to the vapor quality, namely, the ratio of liquid to vapor. However, the bubbles may possibly be an inert gas rather than the metal vapor; in this case, *no* energy is absorbed by the bubble, and an even greater distinction is recorded between liquid and bubble. The resonant absorption frequency is independent of phases, whether the metal is in a solid, liquid or vapor phase.

Several different methods may be utilized for detection of such resonance. In FIG. 1, the detection circuit essentially amounts to a radio receiver and other circuitry which, when calibrated, operates as a means for detecting the size of discrete particles such as vapor bubbles or liquid droplets as a function of the amplitude of the detected RF signal or as a means for detecting the percentage or ratio of liquid droplets to vapor, otherwise referred to as the vapor quality. The detection circuit includes a pick-up antenna 7 which is connected on line 8 to an RF amplifier 9 and a detector 10 and amplitude discriminator circuit 11 having an adjustable amplitude signal threshold for passing only pulses exceeding or below a preset or desired threshold amplitude. The pulses which are passed by discriminator 11 go either directly on line 12 to a recorder 13, while simultaneously they may be counted by a count rate circuit whose output is also connected to the recorder or a meter 13. The recorder or meter 13 thus receives individual pulses on line 12 characteristic of a liquid droplet or void, as well as the rate of such pulses; the recorder is calibrated so that it can thus indicate directly either the size of an individual bubble, the bubble rate, or liquid-to-vapor ratio.

FIG. 2 illustrates one specific embodiment of the invention. The oscillator 4 is of the tube type as shown, and is spaced from the pipe 1 because of the high temperature of the liquid metal. The coil 2 surrounds the pipe and is connected to the oscillator over lines 6 and 5 to form a resonant circuit with condenser 15.

The component parts of the oscillator circuit may be mounted on the insulator 16 or completely separated therefrom. The coil 2 is made of nickel plated copper, or silver wire, or their equivalent, for withstanding moderately high temperature in air or inert gas while maintaining good frequency stability.

The antenna or detector coil shown as 7 and the associated detector circuit shown in FIG. 1 may be similarly mounted on insulator 16 with the detector coil in a preferred posititon proximate the end members 17.

The schematic diagram of FIG. 2 illustrates a preferred tube-type oscillator circuit of the grid-leak type. A tuned parallel circuit 20, including coil 2 and adjustable condenser 15, is connected at one end to ground and at the other end to the grid-leak RC combination of resistor 22 (2 megohms) and condenser 23 (100 $\mu\mu$f.). An output terminal at 24 is connected through diode 25 across the cathode resistor 28. An RF choke and bypass condenser are connected in the anode circuit. A power supply is connected at 26.

In operation, when the frequency of oscillator 3 is varied to approximately 58 mc. in the case of mercury, power is absorbed by the liquid. Antenna 7 and the tuned RF amplifier and detector circuit of FIG. 1 receive the unabsorbed energy, and develop a threshold bias signal during normal operation. Now as a bubble passes, the energy detected increases and exceeds this threshold to result in a pulse on line 12 going directly into the recorder 13 and also into the counter 14 where the rate of such pulses may be counted and subsequently recorded at 13.

If desired, the RF amplifier, antenna and detector 10 may be omitted by utilizing the pulse generated within the oscillator itself. As a bubble passes through coil 2, the oscillator is sightly detuned and an output pulse is developed across terminal 24. Thus as shown in FIG. 1, output terminal 24 of the oscillator (see FIG. 2) may be connected directly over the dotted line 27 as an input into the amplitude discriminator and subsequently recorded and/or counted as described supra.

In FIG. 3, there is shown a conventional transistor oscillator-detector circuit with the antenna-detector coil 2 connected in shunt with condenser 30 to form a tuned circuit. Condenser 30 is normally adjusted with respect to coil 2 to provide an output signal whose frequency is the nuclear resonance absorption frequency of the liquid when excited by the oscillator. Crystal 31 also provides oscillations at this nuclear resonance absorption frequency and is connected to one of the electrodes in the emitter-collector circuit of transistor 36 in shunt with choke 33 and resistor 34. Feedback condenser 32 is adjustable and also provides temperature compensation. The detected signal is developed across base resistor 35 at terminal 24 for connection to the detecting and recorder circuitry on line 27 as shown in FIG. 1. Thus, when the detected signal is at the resonance frequency, it beats with the signal generated by crystal 31 and the difference in amplitude between the two signals is developed across base resistor 35 and is a function of the vapor particles in the liquid or the liquid particles in the vapor. The amplitude of oscillations developed in crystal 31 may be considered as a preset threshold which received signals must exceed for detection to occur.

It should be noted that the embodiments described do not utilize a magnet or magnetic field. The operation depends upon the absorption of the electromagnetic energy by liquids at the nuclear resonance absorption frequency of the liquid, and the amount of such asborption depends on the mass of the liquid metal present. The presence of vapor or bubbles within the liquid metal results in decreased absorption of this electromagnetic energy and an increase in amplitude of the detected signal as recorded.

The detecting and recorder circuits are calibrated to indicate the amplitude of the detected signal in the presence of liquid metal in the pipe with the absence of any bubbles or vapor, as well as with the presence of discrete bubbles of various sizes. The counting circuit 14 counts the number or rate of pulses detected having a value above or below a certain threshold amplitude. The recorder 13 is then calibrated to indicate the percentage of liquid flow in such liquid-vapor flow based upon the count rate of pulses detected above or below a preset threshold.

The principles upon which this inventiton are based will be described briefly based upon the nuclear structure of materials as presently understood. Fundamental particles such as electrons, neutrons and protons are capable of possessing an angular momentum, and act as a small magnet possessing a magnetic moment defined as a magneton, equal to $\mu = eh/4\pi$ mc., where $e$ = the magnitude of the charge
$h$ = Planck constant
$m$ = mass of particle
$c$ = velocity of light It is interesting to note that even a neutron, although elecrtically neutral, has a fairly large negative magnetic moment so that it is equivalent to a spinnning negative charge.

It has been found that a nucleus, because of its magnetic properties, is capable of existing in one of a number of different energy levels in the presence of a magnetic field. Actually, these levels are sub-levels as opposed to the main nuclear energy levels which involve gamma-ray transitions. The spacing of the sub-levels depends upon the magnetic moment of the nucleus and its spin.

Thus, when a nucleus, such as contained in the liquid metal of this application is passed through a magnetic field such as created by the oscillator and coil, energy can be taken from this field by absorption at a particular resonance frequency of the liquid so that the nuclei undergo transitions from lower to higher energy levels. Of course, this energy absorpton may be detected either by the change in current within the oscillator circuit or by an antenna coil positioned for receiving such electromagnetic energy as shown and described.

The nuclear magnetic resonance absorption frequency is defined as:

$$V = \mu H / Ih$$

where $\mu$ = magnetic moment
$I$ = nuclear spin quantum number
$h$ = Planck's constant
$H$ = magnetic field strength where $\mu$neutron = $5.049 \times 10^{-24}$ erg/gauss

I claim:
1. Apparatus for detecting vapor in a liquid metal system, comprising:
an electrically conductive portion of liquid metal carrying pipe in said liquid metal system;
means for transmitting electromagnetic energy into said liquid metal system at the nuclear resonance absorption frequency of said liquid metal, said means located circumjacent said electrically conductive pipe portion;
means for detecting the transmitted electromagnetic energy absorbed by said liquid metal and said vapor, said detection means' output comprising pulses whose amplitude vary with respect to the electromagnetic energy detected; and
means connected to the output of said detection means for recording the amplitude of the detected energy whereby the presence and amount of vapor in said liquid metal is indicated, said recording means including pulse amplitude discrimination means, means for counting the rate of pulses on one side of a predetermined amplitude as so discriminated, and means for indicating the vapor content of the liquid metal based upon said count rate.

2. Apparatus as in claim 1 wherein said electrically conductive pipe portion for transporting liquid metal comprises stainless steel, said means for transmitting electromagnetic energy includes a first coil encircling said conductive pipe portion and a resonant circuit including said first coil tunable for the characteristic nuclear resonant absorption frequency of the liquid metal, and said detection means including an antenna means and a radio-frequency receiver, said radio-frequency receiver being attached to said antenna means.

3. Apparatus as in claim 1 wherein said electrically conductive pipe portion for transporting liquid metal comprises stainless steel, said means for transmitting electromagnetic energy includes a first coil encircling said conductive pipe portion and a resonant circuit including said first coil tunable for the characteristic nuclear resonant absorption frequency of the liquid metal, and said detection including means attached to said transmitting means whereby said electromagnetic energy transmitted may be detected.

4. Apparatus as defined in claim 2 wherein said liquid metal of said liquid metal system comprises mercury.

5. Apparatus as defined in claim 3 wherein said liquid metal of said liquid metal system comprises mercury.

References Cited

UNITED STATES PATENTS

| | | | |
|---|---|---|---|
| 2,888,638 | 5/1959 | Nelson | 324—0.5 |
| 2,964,696 | 12/1960 | Pinkley | 324—0.5 |
| 2,984,781 | 5/1961 | Schwede | 324—0.5 |
| 3,419,793 | 12/1968 | Genthe | 324—0.5 |

RUDOLPH V. ROLINEC, Primary Examiner

M. J. LYNCH, Assistant Examiner

U.S. Cl. X.R.

73—19; 324—58.5